US011443030B2

United States Patent
Mohler et al.

(10) Patent No.: US 11,443,030 B2
(45) Date of Patent: Sep. 13, 2022

(54) METHOD TO ENCODE AND DECODE OTHERWISE UNRECORDED PRIVATE CREDENTIALS, TERMS, PHRASES, OR SENTENCES

(71) Applicants: Sherman Quackenbush Mohler, Gilbert, AZ (US); Jeffrey Scott Wojnar, Gilbert, AZ (US)

(72) Inventors: Sherman Quackenbush Mohler, Gilbert, AZ (US); Jeffrey Scott Wojnar, Gilbert, AZ (US)

( * ) Notice: Subject to any disclaimer, the term of this patent is extended or adjusted under 35 U.S.C. 154(b) by 140 days.

(21) Appl. No.: 16/894,324

(22) Filed: Jun. 5, 2020

(65) Prior Publication Data
US 2020/0387595 A1    Dec. 10, 2020

Related U.S. Application Data

(60) Provisional application No. 62/921,305, filed on Jun. 10, 2019.

(51) Int. Cl.
*G06F 21/46* (2013.01)
*G06F 21/36* (2013.01)

(52) U.S. Cl.
CPC .............. *G06F 21/46* (2013.01); *G06F 21/36* (2013.01)

(58) Field of Classification Search
None
See application file for complete search history.

(56) References Cited

U.S. PATENT DOCUMENTS

| | | | | |
|---|---|---|---|---|
| 8,881,251 | B1 * | 11/2014 | Hilger | G06F 21/31 726/7 |
| 9,361,447 | B1 * | 6/2016 | Bowers | G06F 21/36 |
| 10,440,008 | B2 * | 10/2019 | Alarifi | G06F 21/31 |
| 10,963,582 | B1 * | 3/2021 | McCown | G06F 21/602 |
| 2001/0037468 | A1 * | 11/2001 | Gaddis | G06F 21/34 726/14 |
| 2004/0030934 | A1 * | 2/2004 | Mizoguchi | G06F 21/36 726/18 |
| 2005/0071686 | A1 * | 3/2005 | Bagga | G06F 21/46 726/19 |
| 2007/0006279 | A1 * | 1/2007 | Brown | G06F 21/31 726/1 |
| 2009/0327298 | A1 * | 12/2009 | Jones | G06F 16/2477 |
| 2018/0068334 | A1 * | 3/2018 | Alomar | G06Q 50/01 |

FOREIGN PATENT DOCUMENTS

| | | | | |
|---|---|---|---|---|
| CA | 2922257 A1 * | 2/2014 | | G06F 21/46 |
| WO | WO-2015059365 A1 * | 4/2015 | | G06F 21/32 |

* cited by examiner

*Primary Examiner* — Kaveh Abrishamkar (57) ABSTRACT

This invention describes a method to encode a private term, phrase or sentence whereby the term, phrase, or sentence is never recorded (or required) by the encoding method and said term, phrase, or sentence is only decodable by the encoder or confidants in which the encoding scheme for the private term, phrase, or sentence is shared. A preferred embodiment is a security system for user authentication and credentialing based on personalized memories of the user, allowing for robust recall of an unrecorded private term, phrase, or sentence using sequenced recognizable objects, recall triggers including contextual hints and trusted confidants. The invention is very extensible, providing a flexible method to the user to protect valuable digital assets and/or remote computing devices with complex credentialing values which are virtually impossible to discern by third parties.

6 Claims, 11 Drawing Sheets

101 ——— 2016 Cadillac ATS V

102

103 ——— My favorite car

104 ——— Year Make Model
No Spaces
Model in all caps

<u>100</u>

105 ——— 2016cadillacATSV

FIG. 1

101 ———— August 3, 1990          Goose, Iceman, Viper ———— 101

102 ————     201                                                       ———— 102

103 ———— The date we         Using our combat ———— 103
          were deployed in    nicknames, the
          mmddyy format       order we came
                              home from the war.

All uppercase for ———— 104
200                           the last nickname.

105 ———————— 080390          GooseViperICEMAN ———————— 105

202 ———————————— 080390GooseViperICEMAN

METHOD TO ENCODE AND DECODE OTHERWISE UNRECORDED PRIVATE CREDENTIALS, TERMS, PHRASES, OR SENTENCES

RELATED U.S. PATENT DOCUMENTS

This application claims the benefit of provisional patent application Ser. No. 62/921,305

BACKGROUND

Technical Field

The present invention relates to information technologies. More particularly, the invention relates to a method to encode, decode, recall, and share otherwise unrecorded private data for usage by a user in managing valuable resources including but not limited to the credentials for accessing a remote computing device.

Prior Art

Valuable digital resources are predominant in our modern society, ranging from financial websites and mobile applications for banks and retirement savings, to the increasingly valuable social media where individuals share the story of their lives but in a manner that allows them to control the narrative. While these valuable digital resources perform functions that are useful, helpful, desirable, necessary, etc., they are also quite subject to security breaches largely due to user's having difficulty managing the account credentialing in a manner providing themselves convenient recall while creating strong enough credentialing to prevent unauthorized individuals being able to predict, guess, or use social manipulation to gain the credentials and cause the user financial, emotional, and social harm.

Users of these valuable digital resources face the decision of either using simpler and less secure passwords they can recall, creating more sophisticated but cumbersome passwords they need to document somewhere while hoping no one will get access to them, or using an available password management tool to generate a complex and usually unintelligible password that must then be copied and pasted into the credential screens of the valuable digital resource. Such tools are cumbersome for the user and also make it difficult to create and share robust credentials with any another individual who is sharing an account with the user. Such currently available tools that do support sharing of passwords then have access to all the credentials the user has entrusted to them, and if there is a "bad actor" working for the company that has built the tool, all the user's passwords and their overall financial and social world are now at fundamental risk.

As an overall example, if a husband and wife need joint access to a banking account it becomes instinctual to keep the password as simple as possible, perhaps using the names of their children in order of birth, and this approach then becomes much easier for hacker's who use various "social engineering" attacks to gain enough knowledge of the user to eventually guess and compromise the bank account. The best current alternative to this is to use a password management tool that generates complex passwords that have no contextual meaning to the user and store this locally on the user's devices, while also trusting the company that produced the password management application that their systems are not vulnerable to compromise and will not expose this and all the other couple's passwords.

Modern tooling for password management have other pitfalls as well. Due to the effort of copying and pasting passwords from the password management tool into the credential screens of the valuable digital resource, the personal devices such as a laptop or mobile phone the copying is being conducted on have access to these passwords at the operating system level. In effect if the user's computer or mobile device have been comprised by any of the literal millions of viruses and malware trojans that are pervasive on these devises, these copied passwords are now in the hands of some of the most ingenious and malicious hackers in the world.

Recently there have been additional approaches to authentication that include graphics, but these do not seem to be well adopted in industry due to a number of complications and limitations. These graphical approaches usually involve forcing the digital resource to modify their traditional approach to credentialing to allow the upload of user selected images and then allowing credentialed access based upon various user behaviors in regards to identifying, selecting, moving, and sequencing the images without much in the way of supportive context. In addition to forcing adoption of the graphical approach, once adopted the valuable resource now has access to the images the user relies upon for conducting authentication, which then reduces the value of reusing these images elsewhere since if one valuable resource is compromised that has these images, it allows a hacker to use this knowledge to gain access to the user's other valuable recourses. Other approaches to graphical credentials may impose graphics on the user that are designed as part of a $3^{rd}$ party marketing campaign, in effect a distraction to the user who would almost certainly prefer to focus on the task at hand of accessing the intended valuable resource rather than be pitched some new product. Another failing of many of the graphical approaches is that if the user needs to rely upon recall of some alphanumeric term after reviewing an image, often there are no capabilities to support such recall such as identified individuals that share common context regarding the object, nor do they allow a clear capability for associating any sort of textual or sensory stimulating hints to help with recall. These limited implementations further lack the capability to leverage the significant value of these recognizable images by not providing the ability to share them with other individuals for their own usage; this may be due to the inherent architectural shortfall whereas these other implementations have these recognizable images tightly associated with whatever the initial valuable resource or remote computing device, which thus introduced a high risk for having those resources or devices become compromised if any of the confidants become hostile to the user, or if the textual association with the recognizable object is easier to guess than the user suspects.

Still further, many users and various password management tools focus only on the creation and management of the password aspect of the overall credentialing process, thus trivializing the obvious need to also protect and make robust the traditional username field in the credentialing process and also limiting any additional novel entry fields any valuable digital recourse may choose to require in their credentialing process, such as an additional email address or an additional pin number.

The foregoing examples of related art and limitation related therewith are intended to be illustrative and not exclusive, and they do not imply any limitations on the invention described and claimed herein. Various limitations of the related art will become apparent to those skilled in the art upon a reading and a specification below and the accompanying drawings.

SUMMARY

The device and methods herein disclosed and described provides a solution to the shortcomings in prior art through the provision of a method for encoding private terms, phrases, and even sentences for usage in credentialing to provide access to a remote computing device or any other valuable digital resource that is being protected by credentials whereby the terms, phrases, or sentences used in the credentialing are never recorded (or required) by the encoding method and said term or phrase is only decodable by the encoder or confidants in which the private terms, phrases, and sentences of the encoding scheme are shared.

The system, employing software running on a microprocessor on a local device controlled by the user is configured to allow the user to load an unlimited number of sensory stimulating objects that are familiar and recognizable to the user. The basic intent of a sensory stimulating object aka a recognizable object is typically to allow the user to associate with it an unrecorded fragmentary alphanumeric phrase. The user is then able to recall the fragmentary alphanumeric phrase based on the recognizable object. The user may enrich their ability to recall the unrecorded fragmentary alphanumeric phrase associated with the recognizable object by providing themselves any number of recall triggers such as contextual hints. As an example, the user might have served in the armed forces and thus imports into the system, a recognizable object, a picture of himself with three close comrades with whom he served. The user might then associate contextual hints with the recognizable object such as "Using our combat nicknames, in the order we came home from the Gulf war" to enhance recall of the unrecorded fragmentary alphanumeric phrase the user associated with that recognizable object. A second hint might provide the format of the unrecorded fragmentary alphanumeric phrase such as "All Uppercase for the last nickname". Additional help with recall is improved further by the users association and addition of another recall trigger, the actual comrades and their spouses as confidants with the recognizable object and contextual hints.

In some embodiments of the system the collection of the recognizable object and recall triggers including but not limited to contextual hints and confidants may be called a glyph. The user may go on to create additional glyphs known to these particular confidants from his combat days. Additionally, the user may define more glyphs related to his pet from childhood, known and understood only by his wife and children. Next perhaps the user defines a glyph contextually related to the softball team the user plays with that encodes and allows recall of their rival team along with the year they finally beat that team. Finally a non-obvious correlation of a recognizable object and fragmentary alphanumeric phrase, known only to the user, such as a picture of the golf course where he had his first kiss, the contextual hint suggesting the year of this momentous event provides the embodiment of a glyph highly specific to the user and unknown to anyone else. In this manner the user may then arrange a sequence of glyphs such that either one confidant, a particular group of confidants, or only when confidants across multiple groups are engaged, can help recall the otherwise unrecorded private term, phrase, or sentence represented by the sequenced glyphs. In some embodiments of the system a sequence of glyphs may be referred to as a glyphpass, and a glyphpass may now be used to associate a complex but otherwise unrecorded private term, phrase, or sentence with the password field or any of the other credentialing fields of a valuable digital resource. In addition, a glyphpass may be recorded into the system to protect any digital resource, website, or application that can be configured to require credentialing including but not limited to email programs, digital albums, address books, or any file on the local or remote digital servers or computers where said server or computer supports credentialing at the operating system level.

The system and example provided in this summary can be extended with additional capabilities in many preferred embodiments. One preferred embodiment can allow the user to provide metadata about the structure of the unrecorded fragmentary alphanumeric phrase such as its length or the number of special characters which then enables said preferred embodiment the ability to automatically generate a sequence of glyphs to create a glyphpass which meets any specific criterion the valuable digital resource requires for its credentialing. Preferred embodiments may also provide convenient capabilities for defining confidant groups (communities) that have a collective context for sharing glyphs, glypasses or entire sets of glyphpasses. Various preferred embodiments will enable sharing at the glyph level, at the gyphpass level, and as part of the full credentialing to a specific valuable digital resource. Communication between the user, confidants, and confidant communities can take place in many forms based upon the preferred embodiments including proprietary communications between compute devices in direct control of the various individuals (application program interfaces), in some embodiments facilitated by a centralized private network as part of the embodiment, or in some preferred embodiments leveraging traditional communication protocols such as instant messaging.

The ability to share and impart increased value to any particular glyph and its respective unrecorded fragmentary alphanumeric phrase is a key aspect for many preferred embodiments. In some of these preferred embodiments the ability to create a community of confidants that can, in a game or ideation fashion, start importing recognizable objects into the system visible only to themselves and collaborate on hints and the determination of what the unrecorded term, phrase, or sentence should be provides for a rich user and community experience with the benefit of high quality glyphs for use by all in the community. In some embodiments of the system if these confidants were also registered users of the system they could receive a notification regarding these glyphs for their own usage.

Another key capability of preferred embodiments is the ability to control the legacy and transfer of access to the valuable digital resource in a number of unique and novel manners. The user can opt for declaring a steward for the valuable digital resource where the steward is notified immediately or only when the system determines the user must be incapacitated due to lack of usage. Further the user can then define within the preferred embodiment of the system whether the steward will have the ability to decode the needed unrecorded terms, phrases, or sentences themselves, or create a condition where the steward must engage additional confidants or confidant groups in the decoding process, thus ensuring broader visibility to the transfer of ownership of the valuable digital resource.

It should be noted that while the majority usage of the invention in its preferred embodiments is with the intent of providing robust credentialing and controlled sharing of said credentialing to valuable digital resources, by its nature the invention also provides the capability to protect credentialing to non-digital resources as well. As a hybrid example a user may wish to be assured that it will take the collaboration of two heirs to decode the needed glyphpasses firstly to identify the internet address and credentialing for an online bank account which then contains the details of the two specific lockboxes at the bank's physical location where the user has placed valuable contents she wishes to pass along to the heirs. The account details within the invention specify which lockbox is intended for which heir, but in order to create transparency and clarity in her wishes, both heirs must work together to decode all needed details for the internet based online account. Then, as a final measure, the actual numeric locks to finally open both physical lockboxes are also encoded in glyphpasses, and again in order to decrypt both numeric locks both heirs must collaborate in order for both to gain their final inheritance.

The summary provided here is illustrative only and is not intended to be in any way limiting. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of this invention to provide a security system for user authentication and credentialing which is personalized to the memories of the user, allows for robust recall of an unrecorded private term, phrase or sentence using sequenced recognizable objects, recall triggers including contextual hints and trusted confidants. This invention provides a very extensible, flexible method to the user to protect valuable digital assets and/or remote computing devices with complex credentialing values which are virtually impossible to discern by third parties.

This and other objects of the invention will be brought out in the following part of the specification, wherein detailed description is for the purpose of fully disclosing the invention without placing limitations thereon.

BRIEF DESCRIPTION OF DRAWINGS

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings those skilled in the art will recognize the object oriented modeling in figures one through seven that outline the entities (objects) and their attributes that comprise preferred embodiments of the invention. Figures eight through tem describe flows through the invention a typical user will engage in as they gain value from the invention in terms of robust credentialing protection of their valuable digital and non-digital resources of their choosing. Finally figure eleven provides a reinforcing entity view of the key objects of the invention.

DETAILED DESCRIPTION OF THE PREFERRED EMBODIMENTS

The method and system employing software running on a computing device or a server adapted at the task and having input components, visual display components, and network communication components adapted to the task, providing a means to encode, decode, recall, and share otherwise unrecorded private terms, phrases, or sentences for usage by a user in managing access to valuable resources including but not limited to the credentials for accessing a remote computing device. Such encoding and decoding is enabled by allowing the user to sequentially combine various digitized objects, sounds, or any other sort of sensory stimulating object in a manner that allows the user to recall specific unrecorded alphanumeric fragments for each recognizable object, which then based upon the user defined sequence, gives rise to the final otherwise unrecorded private term, phrase, or sentence. Those skilled in the art will recognize that the more recognizable objects employed in a sequence which only the user or confidants can identify, the more difficult it will be for a hacker or thief to obtain and/or discern the user's credentials including but not limited to a sequence of recognizable objects to be decoded as the user's password, and one to be decoded for the user's name.

The method is well suited to manage credentials used for access control to personal computers, cell phones, smart phones, networks, websites, and other computing or smart devices which may also operate across a network where a user can conventionally 'log in'.

The use of the term objects or sounds herein is not to be considered limiting and can include without limitation any sensory stimulating object that can be incorporated into a computing device including but not limited to discernable photo, drawing, picture, alphanumeric rendering, video, sound or depiction of sound or other item which may be rendered by the pixels of a GUI, or broadcast by loudspeakers, or managed by the computing device in a manner recognizable to a user viewing the GUI or hearing the sounds or experiencing the sensory stimulating object.

It is noted and anticipated that although the invention is illustrated in the following object-oriented figures, flow charts, and simple user interface diagrams, various aspects and features of the disclosed method may be modified when configuring the invention herein. As such those skilled in the art will appreciate the descriptions, depictions, and diagrams are merely set forth in this disclosure to portray examples of preferred modes and are not to be considered limiting in any manner.

Figure 1:
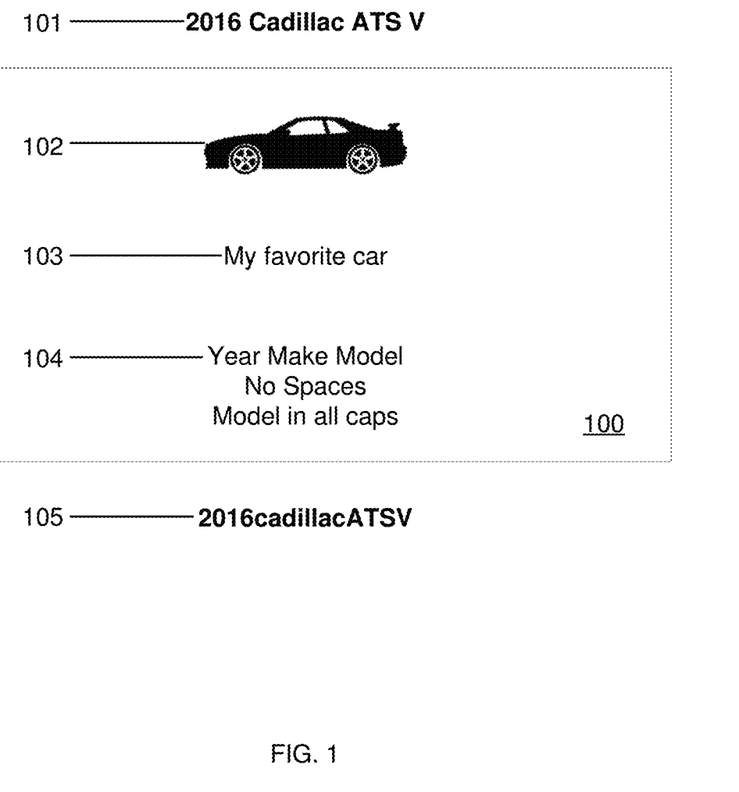
FIG. 1 illustrates the encoding of a private term using the encoding elements of the invention. Shown in the figure is the private term, a recognizable object associated with the private term by the user, and two recall triggers to aid in decoding the recognizable object into the specification of the private term required by the credentialing attribute.

There is seen in FIG. 1 the simplest collection of object-oriented elements 100 orchestrated to provide the capability to encode an unrecorded private term, phrase, or sentence using the encoding elements of the invention into an unrecorded alphanumeric fragment. In one preferred embodiment the user may start with the intent of encoding a specific meaningful private term 101 and import into the computing device, running the appropriate steps for the invention, a single image 102 that the user recognizes and associates with the desired encoded unrecorded alphanumeric fragment 105. To assure the ability to decode the recognizable object into the unrecorded alphanumeric fragment, the user adds an initial alphanumeric term as a recall trigger 103 and then a secondary recall trigger 104 which helps define structural details of the unrecorded alphanumeric fragment 105. Object elements 102, 103, and 104 are sufficient to allow the encoding and decoding of the desired unrecorded private term 101 into the unrecorded alphanumeric fragment. It should be made clear that in this invention and any preferred embodiment neither 101 nor 105 are recorded by the invention, but rather the unrecorded private term 101 can been encoded and decoded without the need to have 101 recorded anywhere. Those skilled in the art will recognize that 102, 103, and 104 can be persisted on the user's local computing device as a set of related objects and stored in many manners including but not limited to a SQL, no-SQL, or file based persistence layer. It should be noted once again that FIG. 1 is intended to convey the object model of a simple scheme for an encoding method of an unrecorded private term, and does not reflect the full robustness of the invention for encoding unrecorded private terms into credentials and further allowing decoding, sharing, and reuse of credentials and recognizable objects with other users for the purpose of building their own encoding and decoding schemas for their otherwise unrecorded private terms, phrases, or sentences.

Figure 2:
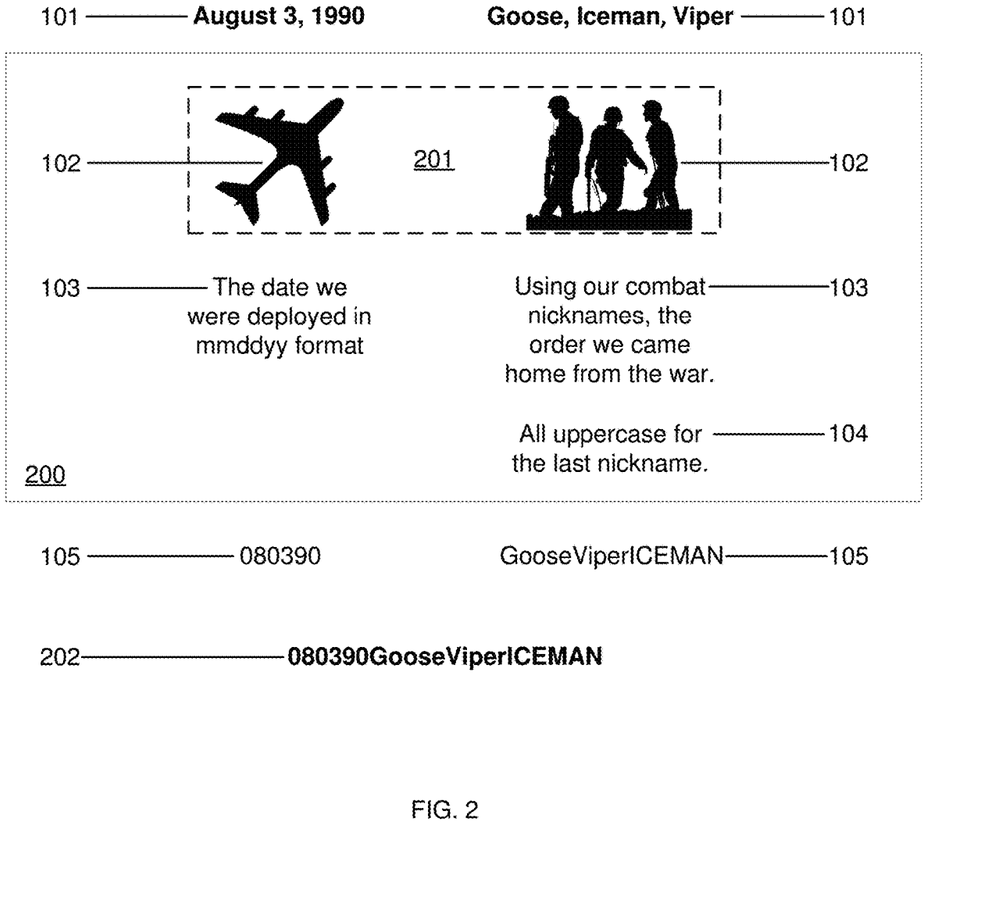
FIG. 2 illustrates a sequence of recognizable objects with corresponding recall triggers. The decoded private term is shown for each recognizable object. A strong credentialing code is achieved upon the concatenation of the sequenced decoded private terms.

There is seen in FIG. 2 object-oriented elements 200 which portray a sequence of recognizable objects 201 that reflect a more robust unrecorded private phrase 202 that would be acceptable for using as a credential to protect a digital asset or remote computing device. It should also be noted that the two sequenced recognizable objects 201 also reflect examples of the user selecting said recognizable objects 102 that are strongly meaningful to the user but much more difficult to decode by merely looking at the recognizable objects 102 and even the recall triggers 103 and 104. The recognizable objects 102 are now collected into a sequence 201 representing first the digital image of a plane, and then the digital image of soldiers. This by definition gives a logical sequencing to the newly encoded unrecorded private phrase 202 based upon the sequenced alphanumeric fragments 105. As needed by the user, recall triggers 103 and 104 have been added to their respective recognizable objects, to support decoding by the user first, each alphanumeric fragment 105 and second the final unrecorded private phrase 202. Once again it should be noted that the original inspiring terms 101 the user cares about and the resultant encoded alphanumeric fragments 105 and final encoded unrecorded private phrase 202 are never persisted within or by the invention in any manner. All object-oriented elements in 200 can be managed and stored in a similar manner as described in FIG. 1. In addition, one skilled in the art can easily increase the object design to allow object 200 to also record the user chosen sequence for the underlying elements and indeed one skilled in the art of object-oriented software design will see the design pattern for persisting, managing, and recalling as part of 200 any desired plurality of sequenced recognizable objects with each recognizable object maintaining reference to any plurality of recall trigger objects.

Figure 3:
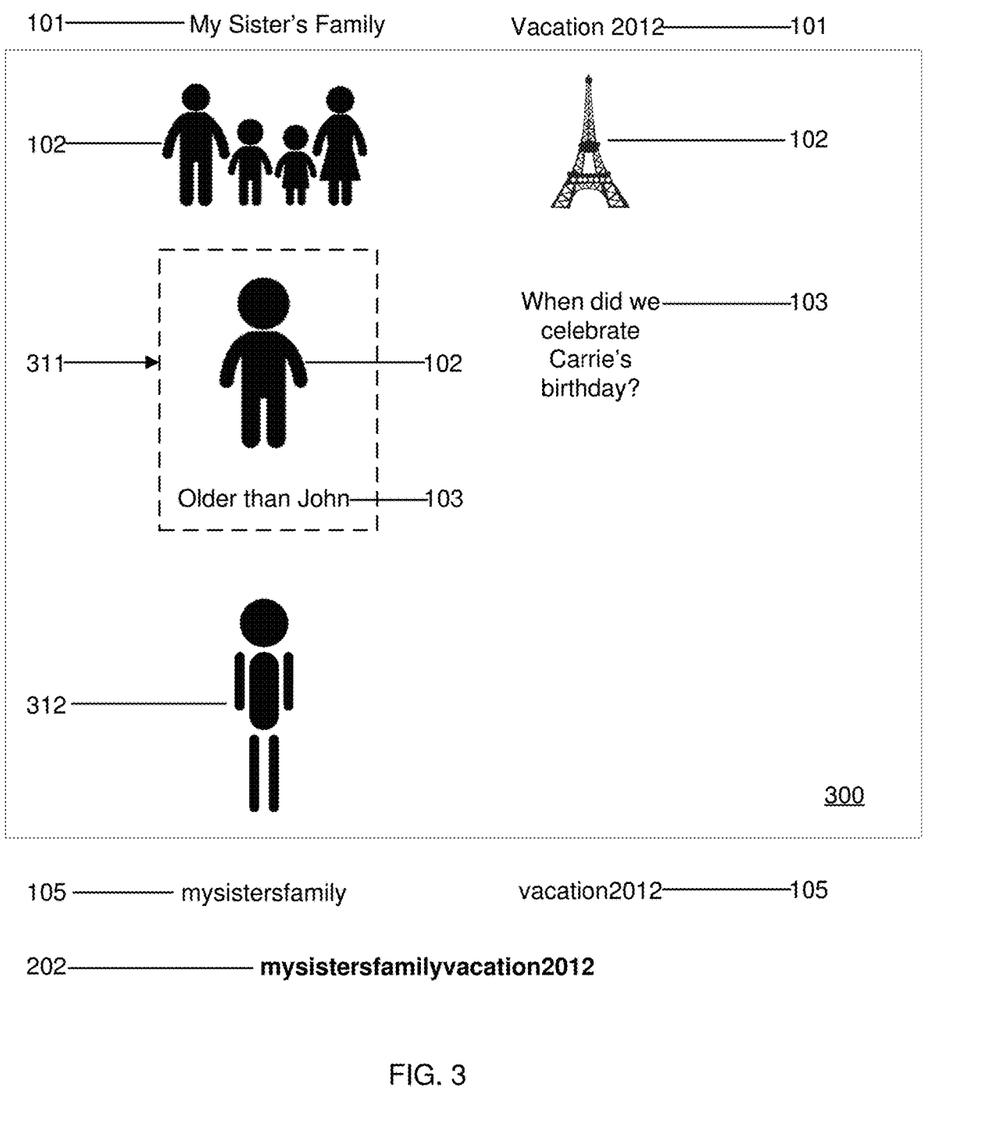
FIG. 3 illustrates a recall trigger itself comprised of a recognizable object and its own recall trigger. A confidant type recall trigger is added to aid the recall of the decoded private term for the private phrase "My Sister's Family"

There is seen in FIG. 3 an increasing level of sophistication in the encoding and ability to decode and recall an unrecorded private phrase 202 based upon initial meaningful terms 101. There exists as in FIG. 2 a simple plurality of two recognizable objects 102, one with an associated alphanumeric recall trigger 103, the other recognizable object using a recall trigger 311 represents the ability to recursively leverage recognizable objects 102 as being recall triggers for other recognizable objects 102, along with their own associated recall triggers 103. Additionally recall triggers can also be a reference to an individual or confidant 312 who shares a common contextual experience with the user and can aid the user in recall of the unrecorded alphanumeric fragment 105 that is associated with the respective recognizable object 102. One skilled in the art of object oriented software design will easily identify any number of object models 300 that can be persisted as previously described and can include object designs for reference of one recognizable object to another recognizable object as a recall trigger. Further, for the recall trigger 312 one skilled in the art of software development will be capable of developing software allowing the object represented as the confidant as either an object wholly contained within the steps of the invention running on the users local computing device and not visible to anyone who does not have access to the user's personal computing device, or as a reference to a record in a digital address book residing either on the user's computing device or called via application programming interfaces (API) from a third party platform such as but not limited to Google or Facebook. As in previous examples, 101 and 105 are not recorded nor required by the invention for the successful encoding, decoding and recall of the private phrase 202.

Figure 4:
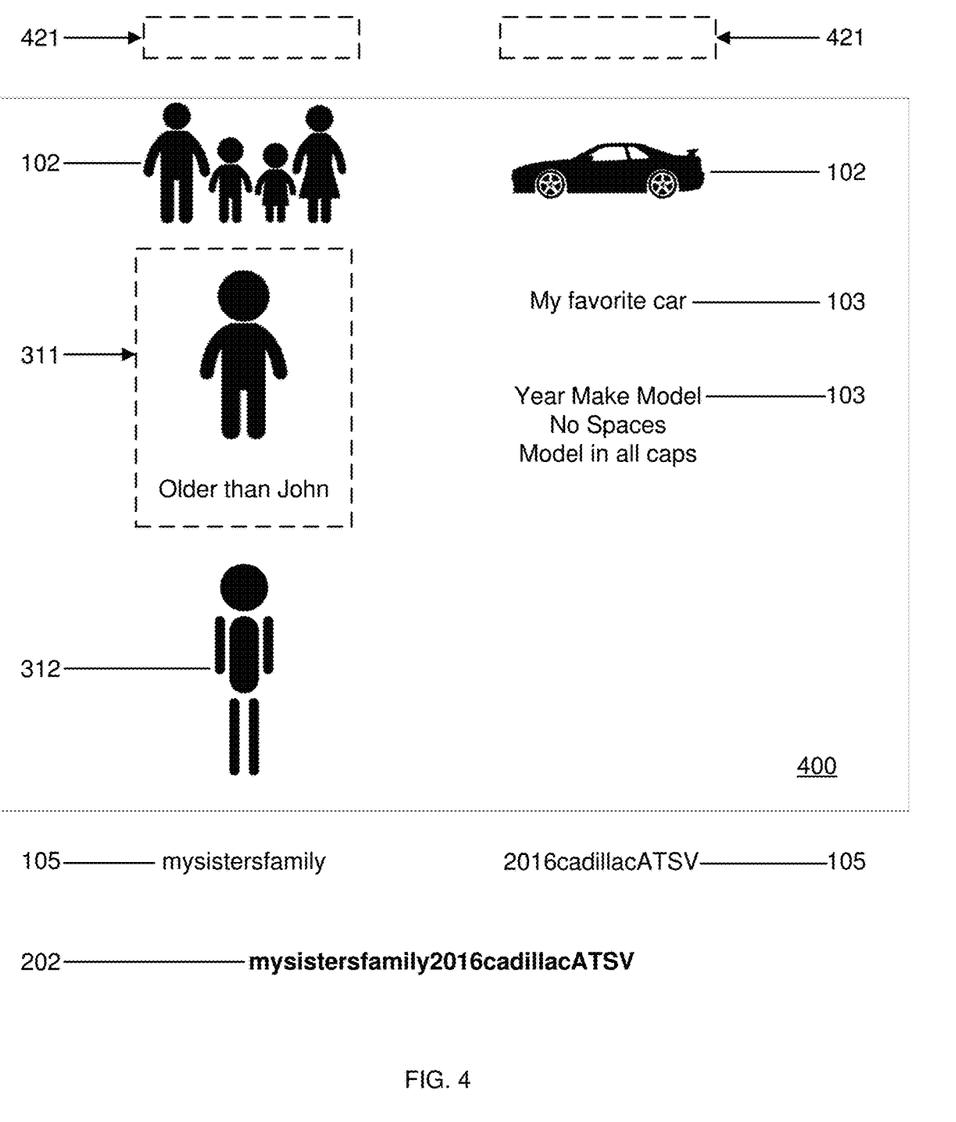
FIG. 4 illustrates how a credentialing code is created by a sequence of recognizable objects based on their respective decoded private terms. The unrecorded private terms do not need to be known initially and can be derived directly from the recognizable objects and recall triggers.

There is seen in FIG. 4 a use case where the object oriented design 400 is identical in structure and pattern to previous examples including a plurality of recognizable objects 102 each with a plurality of recall triggers ranging from alphanumeric textual hints 103 to recursive recognizable objects 311 to confidants 312. This figure is intended to elicit an understanding that the user, as part of this use case, starts initially with recognizable objects he or she has a strong affinity and association with, and as they associate recall triggers with the recognizable objects an easily recalled alphanumeric fragment can start forming in the mind of the user. The invention does not require an initial meaningful term 421 (421 being a null instance of 101 from previous figures) which previously gave the user guidance in terms of which recognizable objects to import into the invention. Rather in this use case, recognizable objects themselves are meaningful to the user and the user crafts the final alphanumeric fragment as they consider what recall triggers of any type to associate with the recognizable object. As in previous examples, 105 is not recorded nor required by the invention for the successful encoding, decoding and recall of the private phrase 202.

Figure 5:
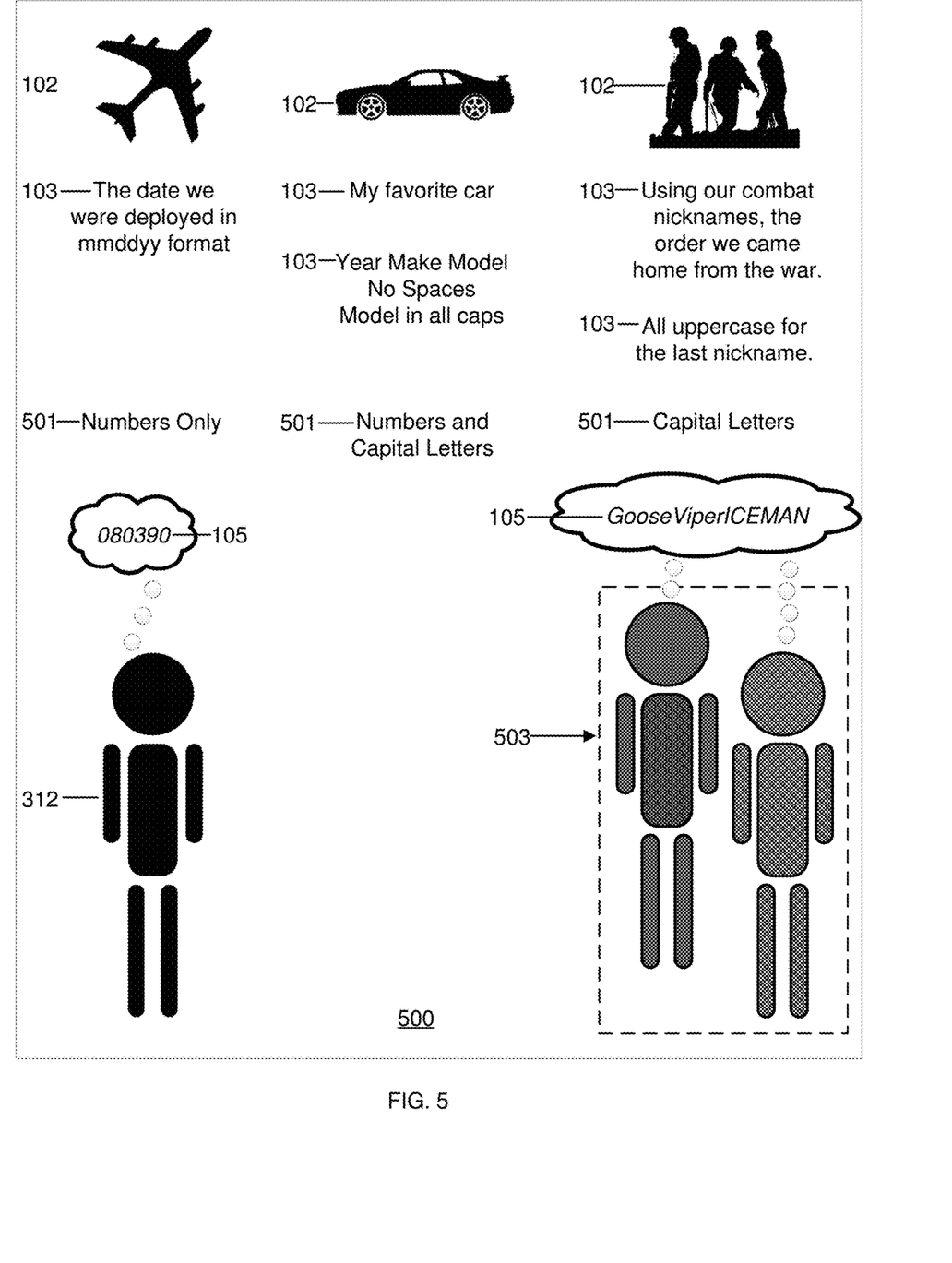
FIG. 5 illustrates an initial library of recognizable objects from which a variety of credentialing codes can be derived. Based on the sequence of recognizable objects, the resulting credentialing code can conform to preset restrictions set forth by the credentialing (authentication) system. Additionally, the credentialing codes may or may not be fully decodable (with the assistance of others) based on whether confidant type recall triggers are assigned to each recognizable object within the sequence.

There is seen in FIG. 5 an object-oriented model 500 for encoding the private term, phrase or sentence which includes the previously discussed plurality of sequenced recognizable objects 102 and recall triggers 103 and 312. In this figure, the object model describes the enhanced design to support more sophisticated recall triggers. These recall triggers 501 include the ability to identify certain structural specifications encoded within the unrecorded term, phrase, or sentence that allow the invention to match criteria a valuable digital resource or remote computing device might require for credentialing such as at least one uppercase letter and one numeric. One skilled in the art of software development will recognize these type of recall triggers indicating structure can be provided as a standard library within the invention for the user to select and associate with a recognizable object to enhance the final unrecorded private term, phrase or sentence. It should be noted that since the user optionally needs to include these types of recall triggers in some preferred embodiments of the invention with the recognizable object conveys the point that the invention itself does not have access to the unrecorded alphanumeric fragment 105 in any manner. Also introduced in FIG. 5 is the ability to include as a recall trigger a confidant community 503 as opposed to a single confident 312 as previously described. One skilled in the art of software development will be able to identify a number of preferred embodiments and development approaches to define the instruction and tasks for the invention running on the local computing device to allow the creation of groups or communities of confidants identified in the user's address books, online platforms via API's, or as steps of the invention running on the users local computer for privately managed confidants. It should be noted that collaboration between confidant, confidant group or confidant community and user and the confidant's ability to recall the unrecorded alphanumeric fragment 105 for the user is not part of the object model, and is an integral feature of the inherent security and novelty of the invention.

Figure 6:
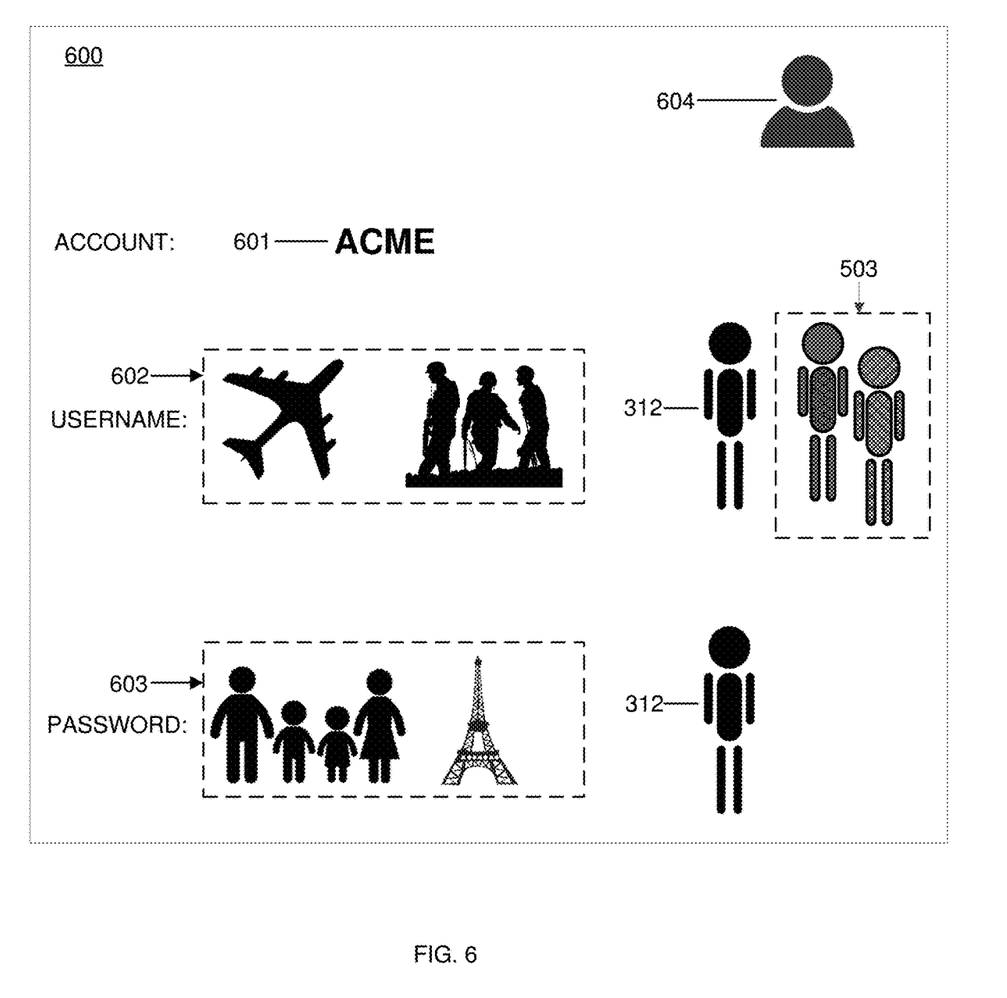
FIG. 6 illustrates the application of two different sequences of recognizable objects assigned to the credentialing attributes of an online account. An account steward, assigned to the account, coordinates with the confidant and confidant communities to decode the credentialing attributes if the user is unavailable. Note: Only a portion of the Password value can be decoded using a confidant recall trigger (See FIG. 3).

There is seen in FIG. 6 a simplified object model 600 for a preferred embodiment of an account as managed by the invention running on the user's local computer. As part of the credentialing for access to a valuable digital resource or remote computing device, two of the typical credentialing elements standard across many internet-based resources are modelled, namely the username 602 and password 603. Both the credentials for username and password are robust, with each requiring the decoding of a plurality of sequenced recognizable objects. For simplicity, this figure does not show any alphanumeric recall triggers that might serve as hints, but it does show a robust association of recall triggers in the manner of confidants 312 and confidant communities 503. In addition to these typical credentials, this figure also shows the user associated a steward 604 with the account, one whom will be able to take over the account if the user is incapacitated or is otherwise unavailable and chooses to transfer ownership. As part of the invention, the user will be able to identify a steward, an individual who has the capability and knowledge to decode all assigned recognizable objects, or an individual who must collaborate with the respective confidants to decode the recognizable objects into the unrecorded alphanumeric fragments which form these typical credentials. A key point, referencing FIG. 3, is that the unrecorded alphanumeric term encoded by the recognizable object depicted by the Eiffel Tower is known only to the user and supported by a single recall trigger. No defined confidant can recall the alphanumeric term represented by the Eiffel Tower. A consideration for selecting the steward is that they are able to decode the associated alphanumeric terms based upon the given recall triggers, or they themselves can decode the needed alphanumeric fragments based upon the recognizable object. Similar to the software development supporting confidants, those skilled in the art of software development may develop preferred embodiments of the invention allowing stewards to be either internally managed within the invention or be associated with the users digital address books or accounts on other digital platforms via API's. Further it should be noted that the object model 600 for the account may hold a plurality of credentialing elements not limited to username and password but also as needed by the credentials of the remote computing device such as, but not limited to, a pin code.

Figure 7:
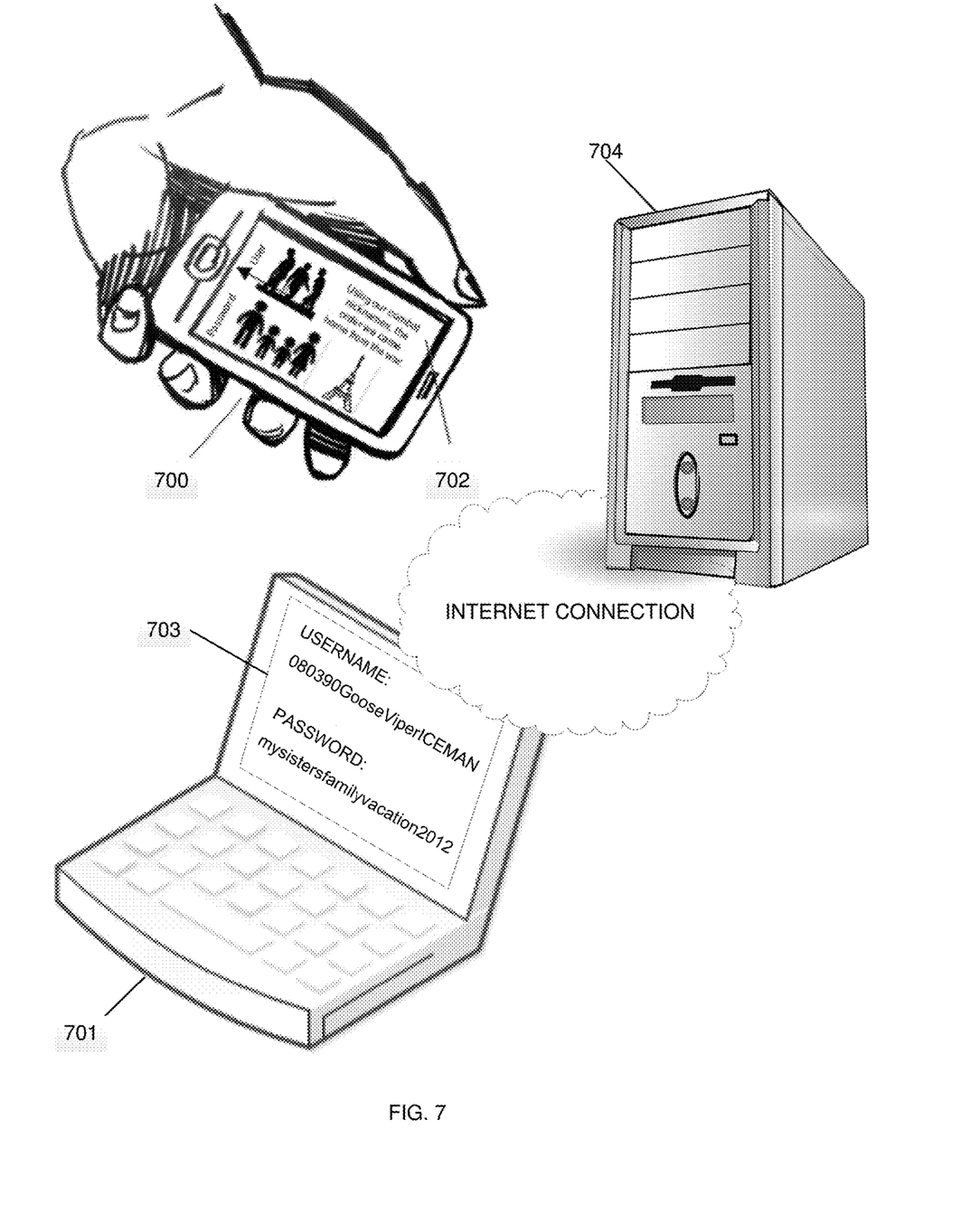
FIG. 7 illustrates using the local computing device to display the sequence of recognizable objects and recall triggers for the credentialing attributes of an online account. The decoded credentialing attribute values (the unrecorded, concatenated private terms) are only typed on the local computing device when prompted by the remote computing device.

There is seen in FIG. 7 the broader environment or topology that preferred embodiments of the invention are intended to provide valuable and robust credential encoding/decoding within. One skilled in the art of software development will recognize the invention will operate in preferred embodiments written in object oriented languages, executing steps and functions for local computing devices such as handheld mobile devices including but not limited to Android and Apple mobile phones 700. In the scenario depicted in this figure, the user has chosen to manage the invention and decoding of the credentials on one local computing device 700 that is completely independent of another local computing device 701 where they are inputting the credentials for the remote computing device 704. The user has selected from the handheld device 700 the appropriate account and is reviewing the encoded representations of both the username and password credentials 702 needed to access the valuable digital resource or remote computing device 704. In this use case, the credentials are required to authenticate via a webpage 703 presented on local computing device 701. Based upon a successful decoding of the private phrases needed for the two credentials, the invention has provided for robust management of the encoding and decoding of the credentials fully independent and isolated from any intrusion or inspection from the local computing device 701 used for input and access to the remote computing device 704.

Figure 8:
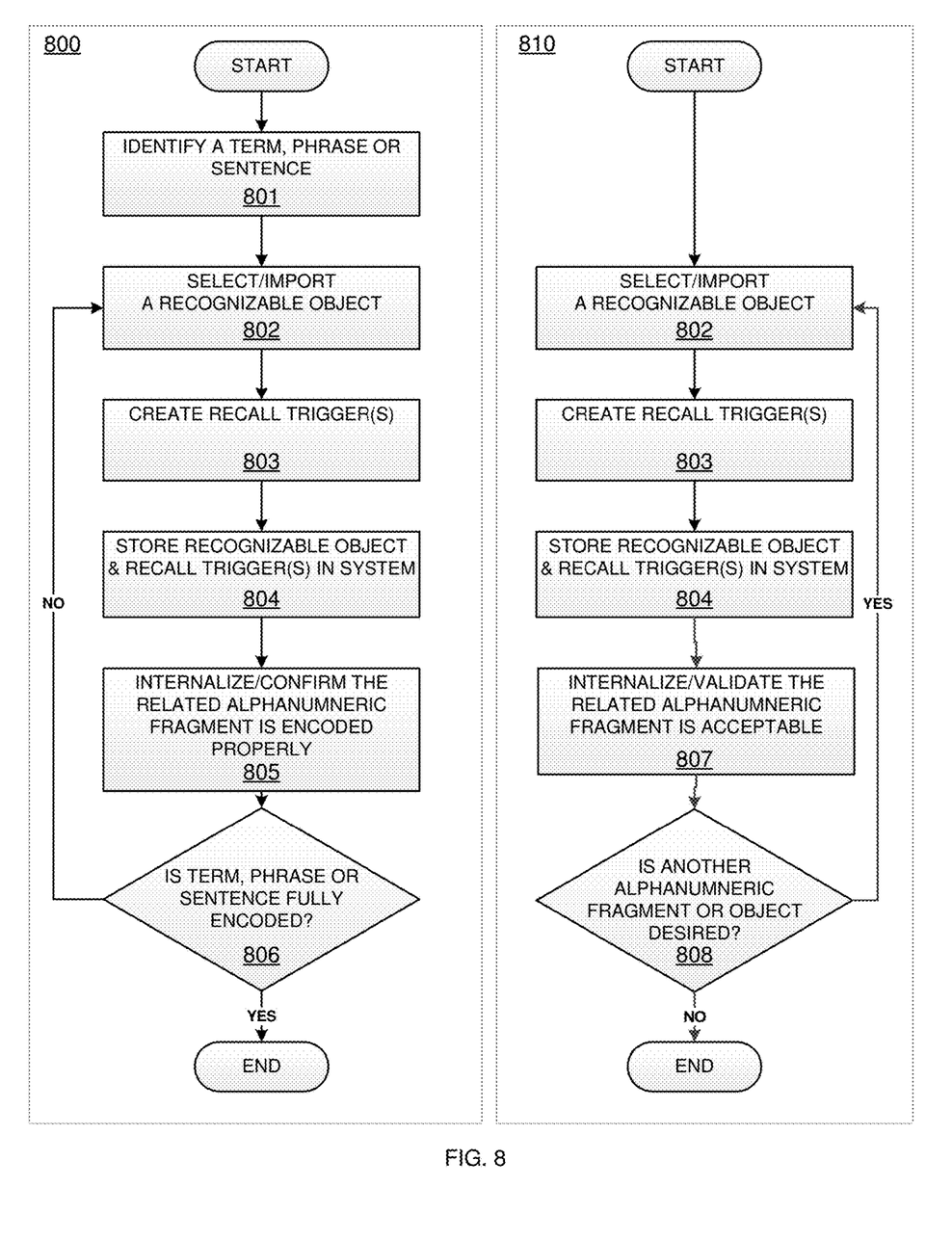
FIG. 8 depicts two processes by which the encoding method is applied. Once process recognizes a private term, phrase or sentence initially. The other process uses the recognizable object to derive an encoded alphanumeric fragment, a portion of a unrecorded private term, phrase or sentence.

There is seen in FIG. 8 two potential use case flowcharts of preferred embodiments for encoding unrecorded alphanumeric fragments and unrecorded private terms, phrases, and even entire sentences for usage in creating credentials for valuable digital resources and remote computing devices. In flowchart 800 the user has a specific meaningful private term, phrase, or sentence 801 they wish to encode. The user selects and imports into the invention running on the user's local computing device a recognizable object 802 from which an encoded alphanumeric fragment 805 can be derived and support the process of completing an encoded private term, phrase, or sentence 806. The user associates recall triggers 803 with the recognizable object 802 to aid the user in decoding the alphanumeric fragment from the recognizable object. The user prompts the system embodying the invention on the local computing device to store the recognizable object and any recall triggers into its persistence layer 804 in a manner for preferred embodiments described previously. If the user reviews 806 the inputted recognizable objects and related unrecorded alphanumeric fragments for recall 805 and determines additional recognizable objects are needed to fulfill the complete encoding and expected decoding of the private term, phrase, or sentence the process is repeated 802. In the alternative flowchart 810 the user begins the process by importing into the local computing device, running the steps of the invention, a recognizable object 802 that has special meaning to the user and then recall triggers 803 associated to the recognizable object. As in the previous flowchart recall triggers 803, including those which can include confidants 312, other recognizable objects 311, confidant groups 503, and structural recall triggers 501 may be added to assure the ability to decode and recall the newly defined and encoded alphanumeric fragment. The recognizable object and related alphanumeric fragment may be used as a final private unrecorded term, phrase, or sentence, or they may be orchestrated themselves as part of a sequence of recognizable objects at a later date as shown in previous figures.

Figure 9:
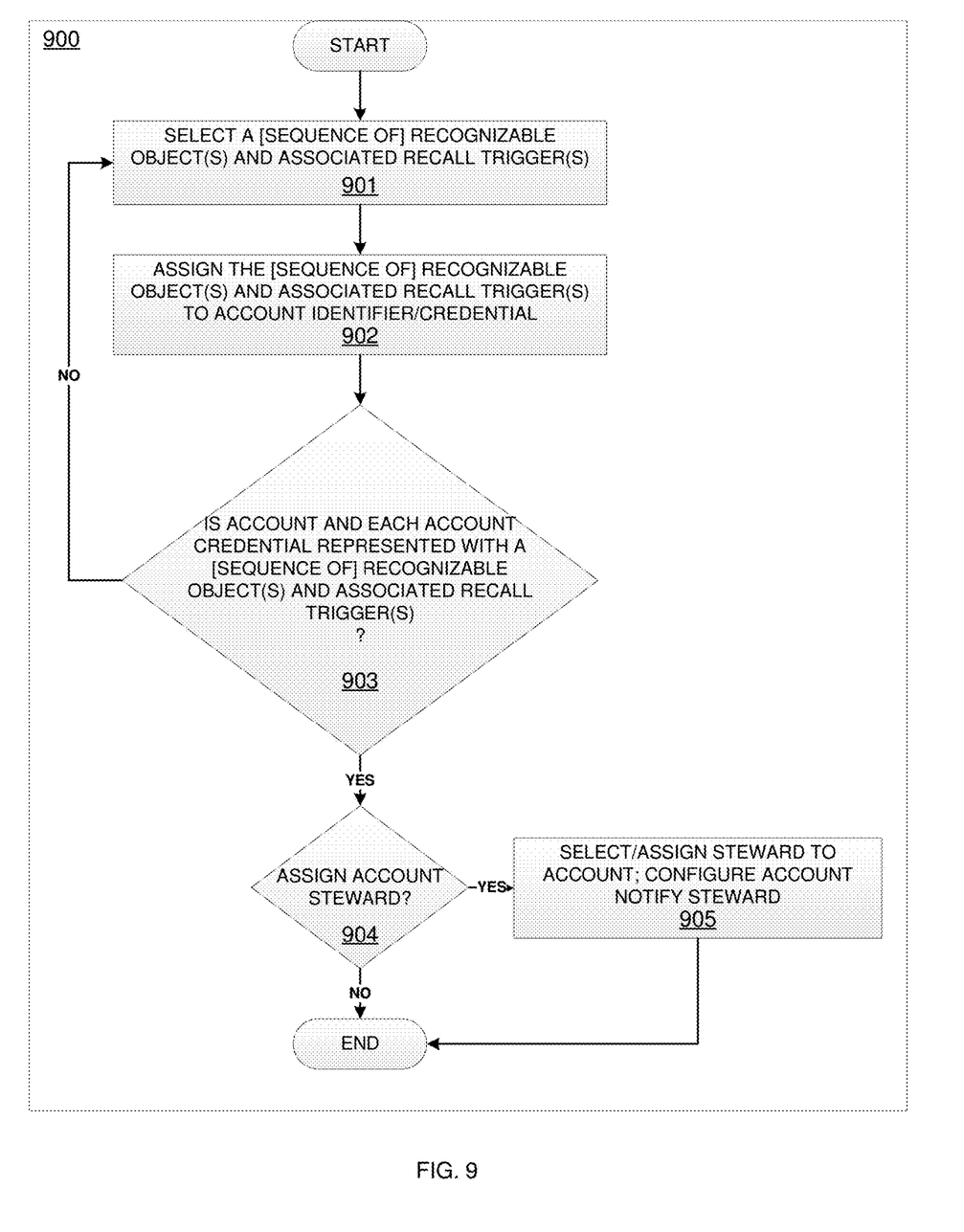
FIG. 9 depicts the process of associating a recognizable object or group of recognizable objects and their respective recall triggers with an account identifier and/or credentialing attributes. An account steward assignment is considered during this process.

There is seen in FIG. 9 the use case flowchart for allowing the user to use the invention's steps 900 as executed on the user's local computing device to define an account for a valuable digital resource or remote computing device and then associate robust private terms, phrases, or sentences to all credentialing attributes of the account. In this preferred embodiment in step 901 the user accesses the invention and starts reviewing and retrieving from storage the sequence of recognizable objects of interest to be associated with a specific attribute of the remote computer's credentials which can include but is not limited to a username or a password. The sequence of recognizable objects assigned to an attribute of the remote computing device's credentials indicates the expected private term, phrase, or sentence the user will decode and then input into the credentialing screen to access the remote computing device. The user assigns the sequence 902 to the specific credentialing attribute within the embodiment of the invention and then reviews whether there are any additional credentials that require a private term 903. If the user has not completed the assignment of recognizable objects for each credentialing attribute, then the process resumes at 901 for each credentialing attribute. If, however the credentialing is complete the user may then decide in 904 if they deem it appropriate to assign a steward to the account 905.

Figure 10:
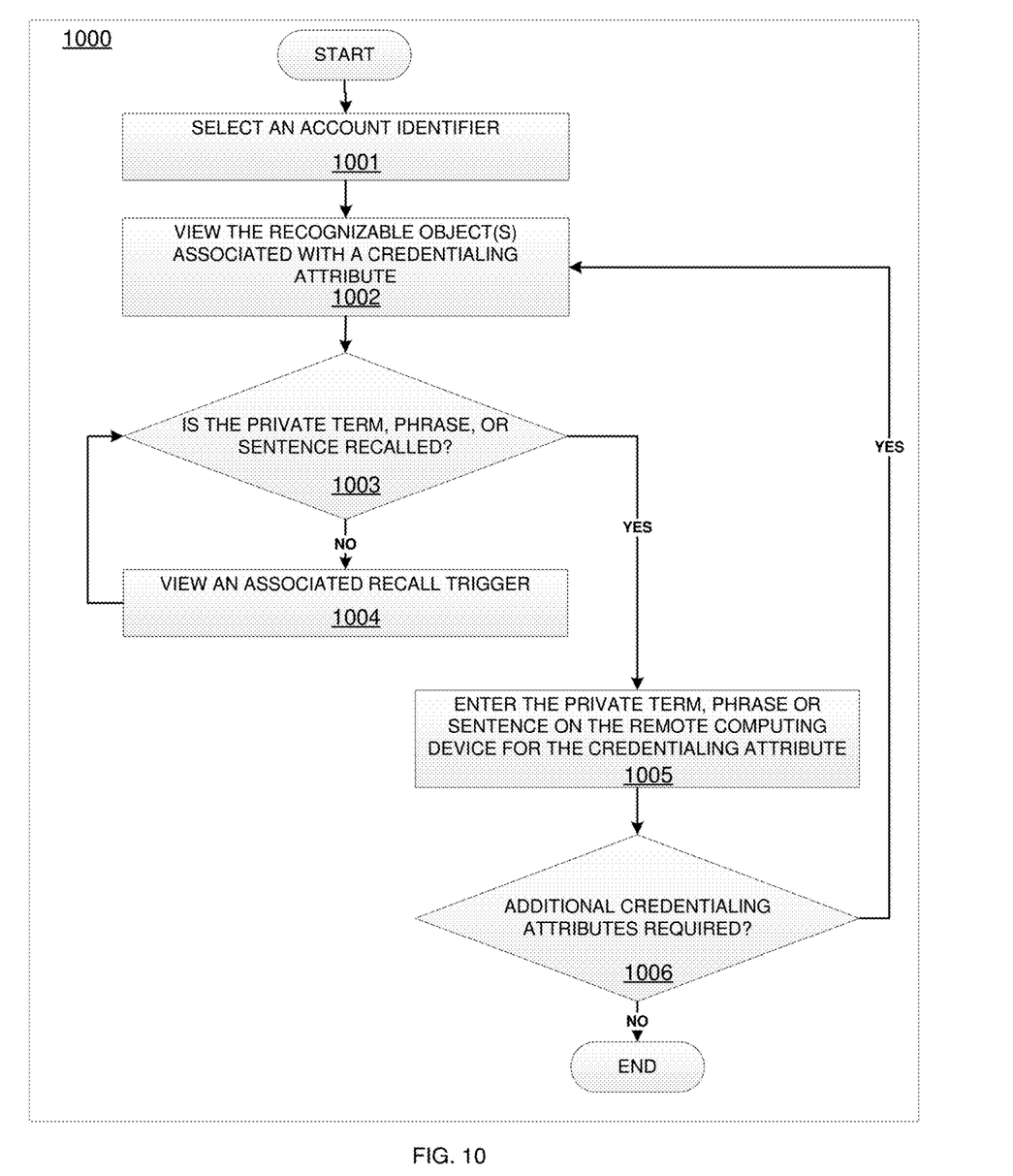
FIG. 10 depicts the process of decoding recognizable objects, using recall triggers if necessary, to obtain the credentialing attributes to access an online account.

There is seen in FIG. 10 the steps in the use case flowchart 1000 for the user to decode the private term, phrase, or sentence related to the credentials for a remote computing device or valuable digital resource. The user uses the steps of the invention running on the local computing device to select the account as persisted in the invention to represent the remote computing device 1001 and its expected credentialing attributes. The user reviews the specific credentialing needed by the remote computing device or valuable digital resource 1002 along with the recognizable objects that were used in the encoding scheme for the needed private term, phrase, or sentence the user will be expected to use to satisfy that attribute of the credentials. If the user is able to recall and decode the needed private term, phrase, or sentence 1003 the user can proceed with entering the private term, phrase, or sentence into the relevant entry field for the digital resources or remote computing device's credentialing screen 1005. If while reviewing the recognizable objects, the user is not able to decode and recall the needed private term or phrase 1003 the user can start reviewing all associated recall triggers 1004. If after entering an attribute of the credentials 1005 there are additional attributes which also need to be fulfilled, the user repeats the process 1002 until all credentialing attributes have been completed and the valuable digital recourse or remote computing device has been accessed.

Figure 11:
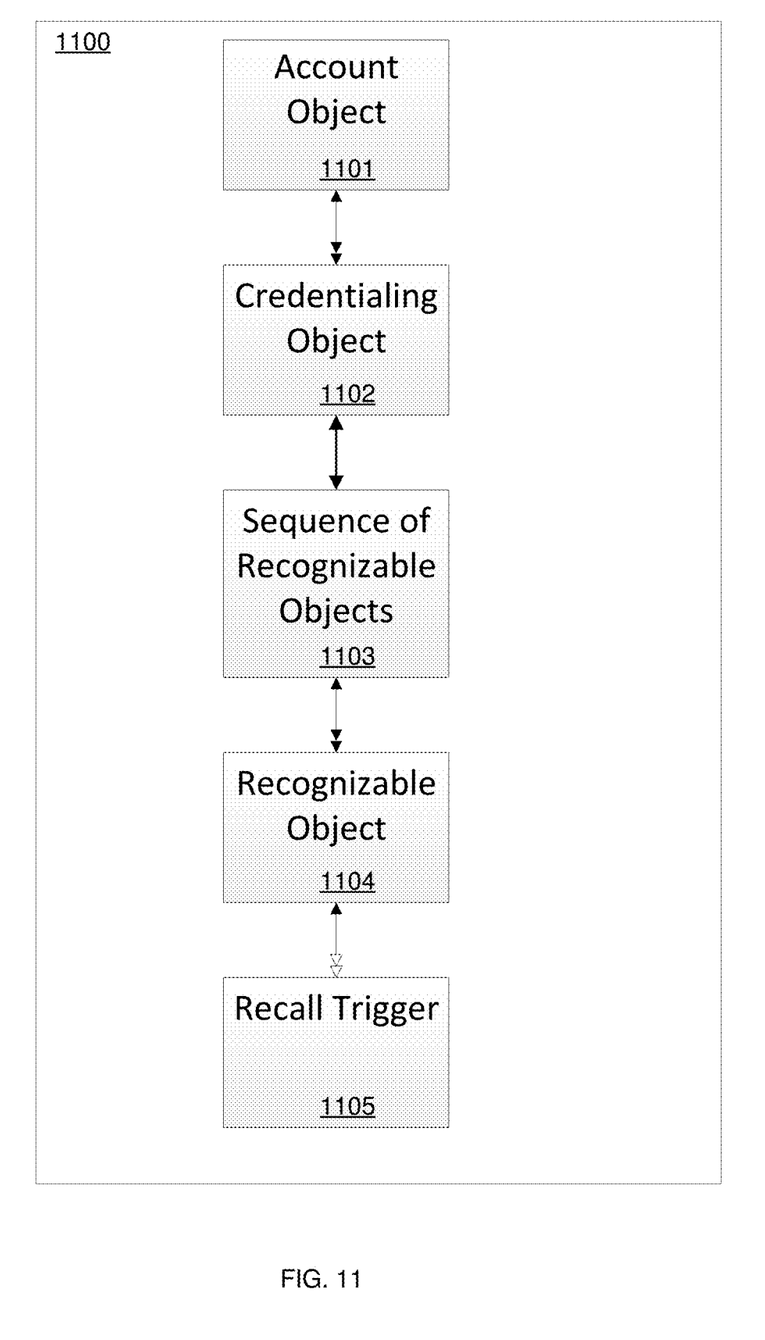
FIG. 11 illustrates the key entities and the relationships between them.

There is seen in FIG. 11 a high-level entity model 1100 for one preferred embodiment of the invention. As previously described, one skilled in the art of software development will be able to engineer the proposed object model into any number of persistence layers including a SQL, no-SQL, or file-based persistence layer. The topmost object for this portion of the invention's object-oriented design models is the account object 1101 that represents the valuable digital resource or remote computing device that requires access via credentialing. The account object 1101 has a plurality of at least one or more dependent sets of objects in the model representing the specific credentialing objects 1102 for the account. In this preferred embodiment, each credentialing object 1102 has exactly one dependent object which persists the associated sequence of recognizable objects 1103. For each associated sequence of recognizable objects, there is a plurality of one or more associated recognizable objects 1104. Any of these recognizable objects 1104 may have none or a plurality of one or more recall triggers 1105.

What is claimed:

1. A method for creating, recalling, managing, versioning, and archiving credentials to identify and access a remote computing device such as a server or home security device, or any other physical resource requiring access credentials henceforth referred to as a valuable resource, using precise reusable data structures where said valuable resource has no direct access to the method, and said method is comprised of at least one server apparatus and at least one local computing device controlled by said user such as a smartphone or personal computer having non-volatile memory and in operative communication with sensory output components such as video displays and audio speakers, and input components such as alphanumeric keyboards, microphones, and touch screens, and running software adapted for operation of and comprising:

a) providing the user the steps for input and storage, leveraging the local computing device's GUI and other input components, digitized rich media of any sensory stimulating type including images, sounds, alphanumeric text, or videos henceforth referred to as recognizable objects;

b) providing the user the steps for defining, leveraging the local computing device's GUI and other input components, one or more recall triggers of any alphanumeric term, phrase, or sentence that helps define a memorable experience related to a particular set of said recognizable objects or a specific said recognizable object to provide it a unique context and thus defining a highly contextualized reusable precise data structure henceforth referred to as a glyph which the user relates to an unrecorded alphanumeric fragment;

c) providing the user the steps for selecting at least two or more said glyphs, leveraging the local computing device's GUI and other input components, to assemble an instance of a precise data structure henceforth referred to as a glyphpass which represents an alphanumeric credential value that is not recorded;

d) providing the user the steps to display said glyphpass leveraging the local computing device's GUI and other input and output components to interact with all elements that comprise any said glyphpass including all said glyphs and said recall triggers, to review and discern the said alphanumeric credential value to support eventual access to said valuable resource;

e) providing the user the ability to identify a specific said glyphpass for each credentialing attribute of the credentialing process for accessing said valuable resource; said credentialing attribute can include the credentialing name, credentialing password, and credentialing codes;

f) providing said user steps to assign a unique account identifier for the logical grouping of all said glyphpasses needed for said credentialing process; said account identifier may be comprised of any alphanumeric value or an additional said glyphpass where said logical grouping of glyphpasses and unique account identifier is henceforth referred to as an account;

g) providing said user steps to retrieve said account identifier presenting the user said glyphpasses, based upon the sequenced glyphs, for recalling said credentialing attributes associated with said account using said sensory output components of the local computing device;

h) providing said user steps to persist a version of all new and updated said recognizable objects, glyphs, glyphpasses, and account identifiers and all interdependencies to a portion of the method henceforth referred to as the glyphpass server hosted on said remote server apparatus which is in communication with said local computing device using secure communication protocols which can include SSL and TLS encryption protocols;

i) providing said user steps to instruct the local computing device to retrieve, either automatically or as directed, all updated versions or new instances of any said recognizable objects, glyphs, glyphpasses, and accounts as persisted on said glyphpass server where communication between the method components residing across the local computing device and said glyphpass server uses secure communication protocols which can include SSL and TLS encryption protocols;

whereby the user can create, recall, manage, version, and archive credentials to access said valuable resource such as a server, home security device or other physical resource requiring access credentials, where said valuable resource has no direct access to the method or any comprised elements of the method.

2. The method of claim 1 further comprising running software on said local computing device or said glyphpass server adapted for providing the user the steps of:

a) defining, adding, or removing any number or type of said recall triggers that helps the user embody and recall a unique memorable experience related to said glyph to help define or refine an instance of a said glyph where at least one recall trigger of some type is retained as part of said glyph;

b) defining one or a plurality of said recall triggers to be any said recognizable object, glyph or glyphpass pre-existing either on said local computing environment or on said glyphpass server, to help define or refine an instance of a said glyph;

c) defining one or a plurality of said recall triggers to be a description or question related to a memorable experience the user is reminded of while viewing the glyph to help define or refine an instance of a said glyph;

d) defining one or a plurality of said recall triggers that provide structural metadata details describing said unrecorded alphanumeric fragment, embodied by the said glyph instance, to describe attributes including but not limited to the number of alphanumeric characters, whether any of the textual characters are upper case, the number of numeric characters, and the number of special alphanumeric characters;

whereby the user can use one or a plurality of said recall triggers allowing contextual memory recall to aid in the decoding of said unrecorded alphanumeric they associate with said glyph.

3. The method of claim 2 further comprising running software on the local computing device or said glyphpass server adapted for providing the user the steps of:

a) defining one or a plurality of said recall triggers as a single individual who is a confidant to aid the user in recall of said unrecorded alphanumeric fragment embodied by said glyph, based upon common joint contextual understanding of said glyph;

b) defining one or a plurality of said recall triggers as a plurality of individuals who comprise a confidant community who can aid the user in recall of said unrecorded alphanumeric fragment as embodied by the glyph, based upon common contextual understanding such as the user's family, friends, current employer, academic alumni, past employer, military service, a particular set of trusted family members, or a particular religious organization;

c) validating and using output components on said local computing device and/or analytics from said glyphpass server regarding which said glyphs that are associated or not with any given single said confidant or confidant community;

whereby the user can allow or prevent the ability of any said glyph to be decoded by any given said confidant or confidant community, thus also allowing or preventing the ability to decode any said glyphpass by said sole confidant or confidant community.

4. The method of claim 3 further comprising running software on the local computing device or said glyphpass server adapted for providing the user the steps of:

a) inputting and storing in said non-volatile memory details on structural restrictions said valuable resource may impose on any specific said credentialing attribute such as the required alphanumeric length for a needed password, the blend of special alphanumeric characters, the length of numeric digits for an input code, or the required amount of time needed between the generation of a different said alphanumeric credential value for said credentialing attribute;

b) comparing said structural restrictions for all said credentialing attributes of said valuable resource to the structure metadata details embodied in said recall triggers representing said unrecorded alphanumeric fragments as embodied by said glyphs in order to construct a glyphpass that is compliant with the structural restrictions imposed by said valuable resource;

c) allowing said user to input and store in said non-volatile memory additional preferences in regard to whether any specific said confidant or confidant community shall be permitted to discern the alphanumeric credential values, by fully decoding all needed said credential attributes, to be able to access said valuable resource;

d) allowing said user to generate unique said unrecorded alphanumeric credential attributes based upon newly sequenced said glyphs into said glyphpasses that can be used for credentialing purposes with said—valuable resource taking into account all structural restrictions for said credentialing attributes and all user preferences in terms of allowance or prevention of other confidants to be able fully decode said alphanumeric credential attribute to discern the unrecorded alphanumeric credential value;

whereby said user can generate as needed new said glyphpasses from newly sequenced said glyphs to represent credentialing attributes for access to said valuable resource based upon said structural restrictions to said—valuable resource and also according to said user preferences in terms of whether the credentialing attributes should be decodable by a given said confidant or confidant community, or can only be decoded by a collaboration effort across multiple said confidants or confidant communities, or is intended to never be decodable by anyone other than said user.

5. The method of claim 4 further comprising said glyphpass server having non-volatile remote memory storage ranging from traditional databases to nontraditional database mechanisms including but not limited to nosql or cloud based blob storage, and in operative communication with said local computing devices controlled by said user and each said confidant and running software on their respective said local computing devices adapted to:

a) providing the steps for said user to transmit into said remote memory storage a copy of any said glyphs and glyphpasses with all related recognizable objects and recall triggers associated with any said account or any said confidant or confidant community;

b) providing the steps for said user to allow the communicating and sharing of said account, said glyphpasses and all dependent data structures comprising said glyphpasses—with said confidants or confidant communities for their own usage; said content delivery method may use conventional communication methods including but not limited to email, application programming interfaces, text messaging, or rich media SMS messaging however the strongly preferred method to guarantee security, delivery and current versions of all data structures created by the user is by leveraging said glyphpass server hosted on said remote server apparatus which is in communication with said local computing devices using secure communication protocols which can include SSL and TLS encryption protocols;

c) allowing the user reuse of any said recognizable objects or said glyphs that have been transmitted into said remote memory storage with said confidants and said confidant communities for their own usage in said confidant's own creation of said glyphs, glyphpasses, and accounts;

d) providing the steps for said user to define additional said confidant communities based upon the increased sharing of said recognizable objects, where all said confidants in the community have a common set of said accounts, glyphpasses, glyphs, and recognizable objects;

whereby the user, without needing to commit any said unrecorded alphanumeric fragments embodied by glyphs or any said unrecorded credential values embodied by glyphpasses used for credentialing, can share them with confidant and confidant communities through the mechanism of sharing said recognizable objects, glyphs, glyphpasses, and accounts.

6. The method of claim 5 further comprising an individual who is an account steward for said account where both said user and steward are running software on the local computing device in communication with said glyphpass server using secure protocols such as TLS and SSL where the glyphpass server and the local computing device are capable of providing the steps for:

a) allowing said user to assign a specific said steward to a specific said account, who can be included in receipt of communications from said associated confidants regarding said glyphpasses relating to said unrecorded credential values for access to said valuable resource;

b) defining account alerts to be sent to said account steward based upon either a timed amount of inactivity or based upon said user's continuous access to recall triggers signifying an inability to perform the decoding themselves for all needed credentialing attributes for said valuable resource;

c) allowing said user to define whether said steward has immediate access to said account and said glyphpasses representing said unrecorded credential values for said valuable resource, or if access is only allowed after any said account alert has been activated;

d) allowing said user to assign if desired an additional said glyphpass that must be decoded to obtain the appropriate unrecorded value by said account steward in order to proceed with access to all said account credentialing attributes and accordingly access to all needed or associated sequenced recognizable objects, recall triggers, and confidants in order to decode all credential attributes for said valuable resource;

whereby in the event said user is incapacitated and unable to perform the decoding themselves due to death or illness, can determine through the election of said account steward a line of succession for access to said valuable resource.

\* \* \* \* \*